United States Patent
Imai et al.

(10) Patent No.: US 7,548,339 B2
(45) Date of Patent: Jun. 16, 2009

(54) AUTOMATIC TRIMMING OF IMAGE DATA

(75) Inventors: Toshie Imai, Nagano-ken (JP);
Takahiko Koizumi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 826 days.

(21) Appl. No.: 10/717,305

(22) Filed: Nov. 18, 2003

(65) Prior Publication Data
US 2004/0223187 A1 Nov. 11, 2004

(30) Foreign Application Priority Data

Nov. 18, 2002 (JP) ............................. 2002-333109
Nov. 10, 2003 (JP) ............................. 2003-379560

(51) Int. Cl.
*G06F 15/00* (2006.01)
(52) U.S. Cl. .................. 358/1.18; 358/1.2; 358/1.9; 358/1.12; 358/451; 358/452; 348/207.2
(58) Field of Classification Search ............... 358/1.12, 358/1.18, 1.9, 453, 452, 1.2, 1.15, 451; 382/282; 348/207.2
See application file for complete search history.

(56) References Cited

U.S. PATENT DOCUMENTS

| 6,011,547 | A | 1/2000 | Shiota et al. | |
|---|---|---|---|---|
| 6,351,321 | B1 * | 2/2002 | McIntyre et al. | 358/450 |
| 6,765,691 | B2 * | 7/2004 | Kubo et al. | 358/1.9 |
| 6,801,334 | B1 * | 10/2004 | Enomoto | 358/1.18 |
| 7,095,526 | B1 * | 8/2006 | Housel | 358/1.18 |
| 2002/0067511 | A1 * | 6/2002 | Fujita | 358/3.06 |
| 2004/0239982 | A1 * | 12/2004 | Gignac | 358/1.15 |

FOREIGN PATENT DOCUMENTS

| JP | 04-253471 | 9/1992 |
|---|---|---|
| JP | 08-154244 | 6/1996 |
| JP | 11-331542 | 11/1999 |
| JP | 2000-296652 | 10/2000 |
| JP | 2001-128109 | 5/2001 |
| JP | 2002-094907 | 3/2002 |
| JP | 2002-305702 | 10/2002 |

OTHER PUBLICATIONS

Abstract of Japanese Patent Publication No. 11-331542 Pub. Date: Nov. 30, 1999, Patent Abstracts of Japan.
Abstract of Japanese Patent Publication No. 2000-296652 Pub. Date: Oct. 24, 2000, Patent Abstracts of Japan.
Abstract of Japanese Patent Publication No. 04-253471 Pub. Date: Sep. 9, 1992, Patent Abstracts of Japan.
Abstract of Japanese Patent Publication No. 08-154244 Pub. Date: Jun. 11, 1996, Patent Abstracts of Japan.
Abstract of Japanese Patent Publication No. 2001-128109 Pub. Date: May 11, 2001, Patent Abstracts of Japan.
Abstract of Japanese Patent Publication No. 2002-094907 Pub. Date: Mar. 29, 2002, Patent Abstracts of Japan.
Abstract of Japanese Patent Publication No. 2002-305702 Pub. Date: Oct. 18, 2002, Patent Abstracts of Japan.

* cited by examiner

*Primary Examiner*—Chan S Park
(74) *Attorney, Agent, or Firm*—Martine Penilla & Gencarella, LLP

(57) ABSTRACT

Image production record information related to image data is used to determine whether or not to execute a trimming process. Exposure program data and photograph scene data or subject area information, etc., are used as the image production record information.

7 Claims, 14 Drawing Sheets

| TAGS | PARAMETER VALUES |
|---|---|
| SUBJECT AREA | ・SUBJECT POSITION<br>・AREA OF SUBJECT |
| EXPOSURE PROGRAM | NORMAL |
| PHOTOGRAPH SCENE | STANDARD |
| APERTURE VALUE | F8 |
| ISO SPEED RATE | 100 |

ENLARGE/REDUCE

ENLARGE/REDUCE

ENLARGE/REDUCE

AUTOMATIC TRIMMING OF IMAGE DATA

BACKGROUND OF THE INVENTION

1. Field of the Invention

The present invention relates to a technique for trimming images.

2. Description of the Related Art

When images photographed with digital still cameras are printed, only a printing range with an aspect ratio different from that of the image can sometimes be printed. The portions outside the printing range are cut off, which is referred to as trimming.

However, in the conventional technology, problems arise because trimming is always turned off and on in the same way for all cases. For example, when all images are trimmed, parts of objects in the photograph (such as people) which are important in terms of the picture composition may be cut off. Another problem is that the picture composition intended by the user at the time the picture was photographed may not be reflected as a result of the trimming process.

SUMMARY OF THE INVENTION

An object of the invention is to provide a technique for suitably determining whether or not to execute a trimming process for individual image data.

The output device according to the present invention outputs an image using image data produced by an image-producing device, and image production record information related to the image data, and is characterized by comprising: an image data processor for executing a trimming process upon determining whether or not to trim the image data based on the image production record information; and an image output device for outputting an image according to the image data processed by the image data processor.

The output device in the invention appropriately determines whether or not to execute a trimming process for individual image data because the determination on whether or not to execute the trimming process is based on the image production record information related to the image data.

The present invention can also be implemented in various embodiments, such as an image output method and image output device, image processing method and image processing device, computer programs for executing the functions of such methods or devices, and computer-readable media on which such computer programs are stored.

These and other objects of the invention, its features, aspects, and advantages will become more apparent in the following preferred embodiments and drawings.

DESCRIPTION OF THE PREFERRED EMBODIMENTS

The output image process for image files according the invention will be described in the following order in the embodiments below with reference to the drawings.
A. Structure of Image Output System
B. Structure of Image File
C. Structure of Image Output Device Capable of Using Image File
D. Image Data Process in Digital Still Camera
E. Image Data Process in Printer
F. Example of Automatic Image Data Process
G. Structure of Image Output System Using Image Data Processing Device
H. Variants

A. Structure of Image Output System

Figure 1:
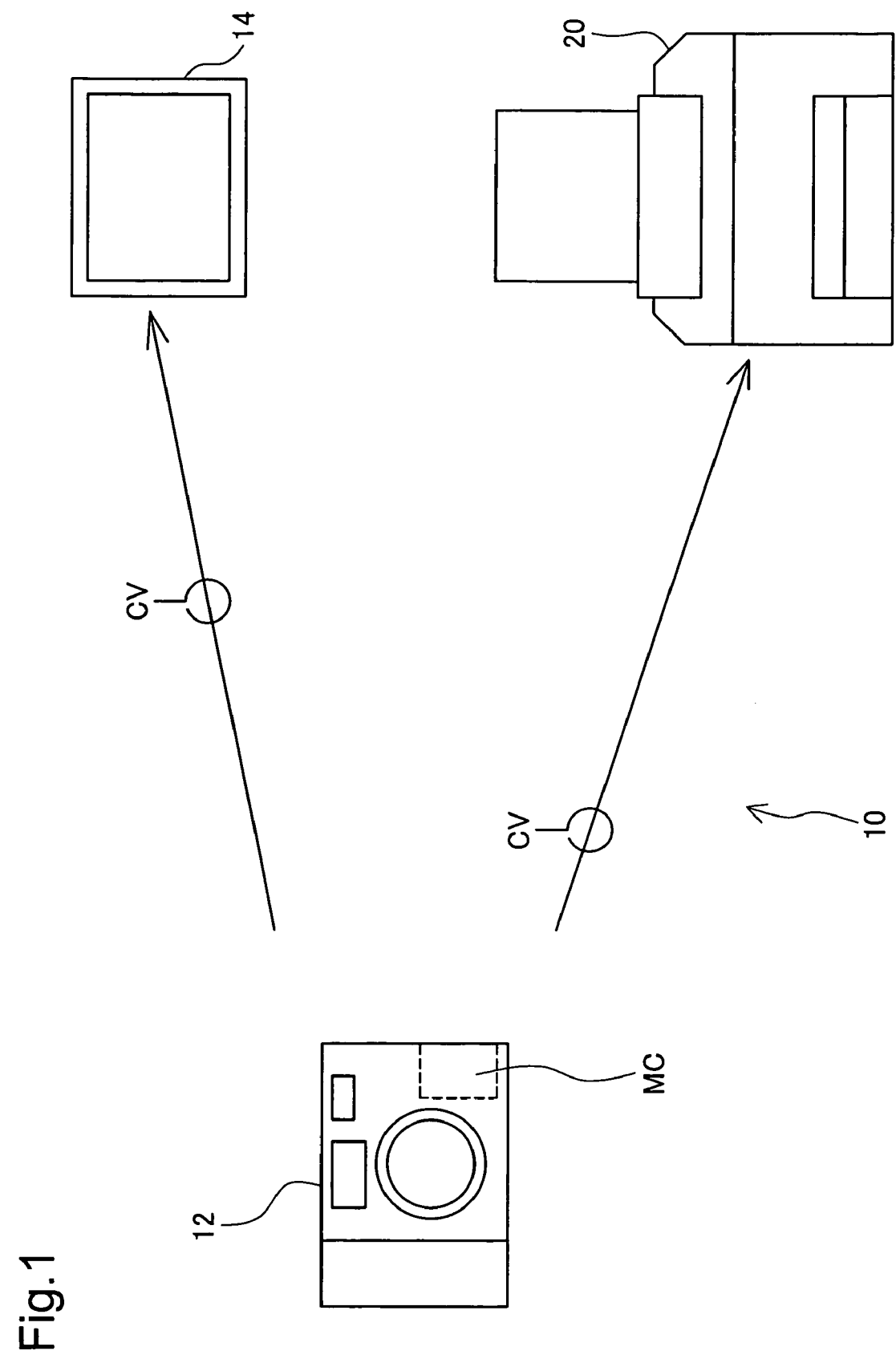
FIG. 1 is a block diagram showing the structure of the image output system in a first embodiment of the invention.

FIG. 1 illustrates an example of an image output system capable of using an output device according to a first embodiment of the invention. The image output system 10 comprises a digital still camera 12 as an image-producing device for producing an image file, and a printer 20 as an image output device. The image files produced by the digital still camera 12 are sent to the printer by directly inserting a memory card MC (on which the image files are stored) through a cable CV to the printer 20. The printer 20 outputs an image upon processing the image data based on the read image file. A monitor 14 such as a CRT display or LCD display, a projector, or the like can also be used instead of the printer 20 as the output device. In the following description, a printer 20 equipped with an image data processor and an image data output unit is used as the output device, and memory cards MC are directly inserted into the printer 20.

Figure 2:
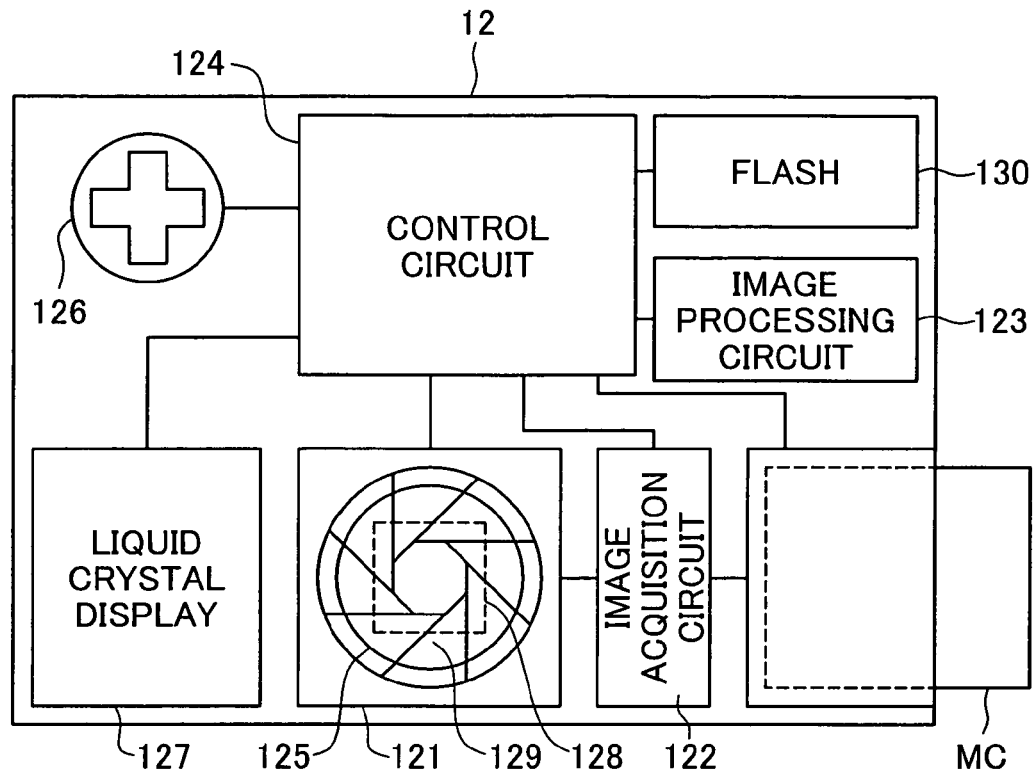
FIG. 2 is a block diagram showing the schematic structure of a digital still camera 12.

FIG. 2 is a block diagram schematically illustrating the structure of a digital still camera 12. The digital camera 12 in this embodiment comprises an optical circuit 121 for collecting optical information, an image acquisition circuit 122 for acquiring an image by controlling the optical circuit, an image processing circuit 123 for processing the acquired digital image, a flash 130 serving as a supplementary light source, and a control circuit 124 for controlling the circuits. The control circuit 124 is equipped with memory (not shown). The optical circuit 121 comprises a lens 125 for gathering optical information, an aperture 129 for controlling the amount of light, and a CCD 128 for converting the optical information passing through the lens into image data.

The digital camera 12 stores the acquired images in the memory card MC. The image data in the digital camera 12 is generally kept in JPEG format, but other formats can also be used, such as TIFF, GIF, BMP, and RAW data formats.

The digital camera 12 also comprises a select/set button 126 for setting various photographing conditions, and a liquid crystal display 127. The liquid crystal display 127 is used when previewing photographed images, setting an aperture value using the select/set button, and so forth.

When the digital camera 12 is used to take a photograph, the image data and image production record information are stored as image files in the memory card MC. The image production record information (described in detail below) can include set parameters such as the aperture value when photographs are taken (when image data is produced).

B. Structure of Image File

Figure 3:
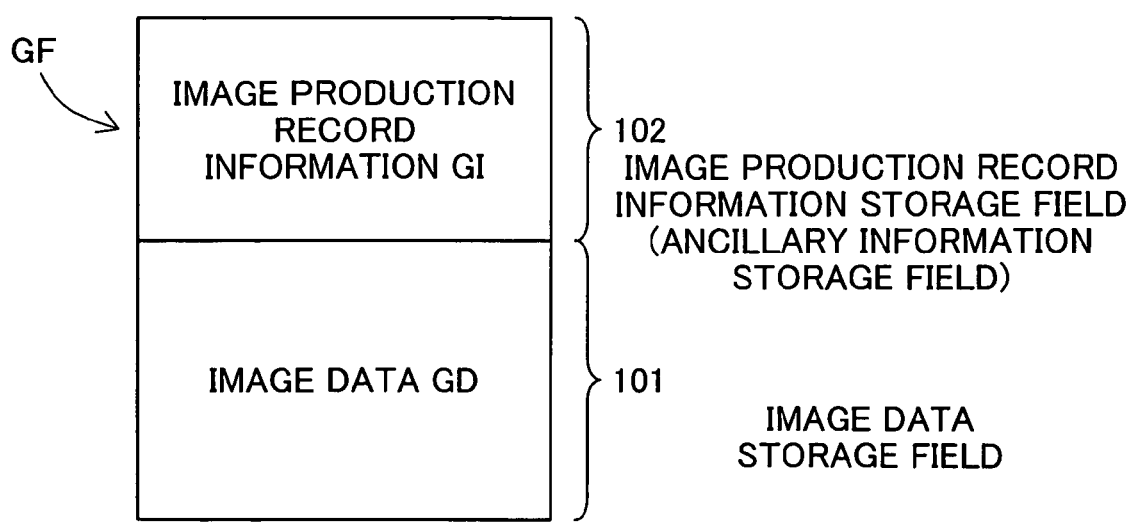
FIG. 3 schematically illustrates an example of the internal structure of an image file which can be used in the embodiment.

FIG. 3 schematically illustrates an example of the inner structure of an image file which can be used in the embodiment. The image file GF comprises an image information storage field 101 where the image data GD is stored, and an image production record information storage field 102 where the image production record information GI is stored. The image data GD is stored, for example, in JPEG format, and the image production record information GI is stored, for example, in TIFF format (format in which information and information field are specified using tags). The terms "file structure" and "data structure" in this embodiment mean the structure of files or data while the files or data are stored in memory.

The image production record information GI is information related to the image when the image data is produced (when photographs are taken) in the image-producing device such as the digital camera 12, and includes the following settings.

Subject distance
Subject distance range
Subject area
Exposure program
Exposure time
Aperture value
ISO Speed rate (ISO sensitivity)
Photograph scene
Manufacturer's name
Model name
Gamma value The image files in this embodiment should basically have an image data storage field 101 and an image production record information storage field 102, and may have a file structure according to an existing standardized file format. The following specific description pertains to cases where the image file GF pertaining to this embodiment conforms to the Exif file format.

An Exif file has a file structure in accordance with the digital still camera image file format specification (Exif). The specification has been established by the Japan Electronics and Information Technology Industries Association (JEITA). Similar to the conceptual diagram in FIG. 3, the Exif file format comprises a JPEG image data storage field for storing image data in the JPEG format; and an ancillary information storage field for storing information of various kinds relating to stored JPEG image data. The JPEG image data storage field corresponds to the image data storage field 101 in FIG. 3, and the ancillary information storage field to the images generation record information storage field 102. The ancillary information storage field stores image production record information relating to a JPEG image, such as photographing date/time, aperture value, and subject distance.

Figure 4:
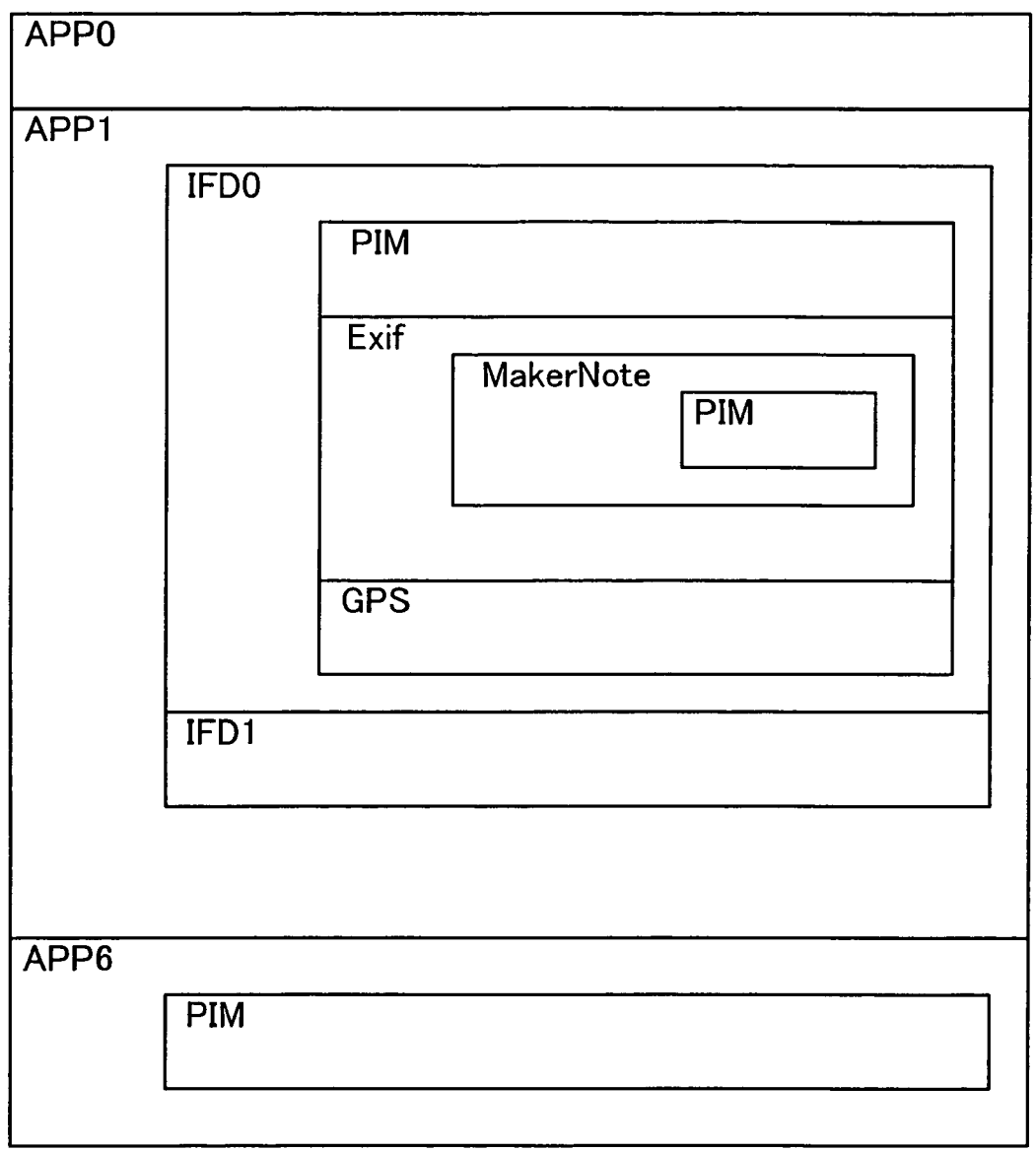
FIG. 4 illustrates an example of the data structure of an ancillary information storage field 103.

FIG. 4 is an explanatory diagram describing an example of data structure of the ancillary information storage field 103.

In the Exif file format, hierarchical tags are used to designate data fields. Each data field contains within it a plurality of subordinate data fields identified by subordinate tags. In FIG. 4, areas enclosed by rectangles represent single data fields, with tag names noted at upper left. In this embodiment, three data fields whose tag names are APP0, APP1, and APP6 are contained. The APP1 data field contains within it two data fields whose tag names are IFD0 and IFD1. The IFD0 data field contains three data fields whose tag names are PIM, Exif, and GPS. Data and data fields are stored according to a prescribed address or offset value, allowing the address or offset value to be searched by means of tag name. On the output device end, data corresponding to desired information can be acquired by specifying an address or offset value corresponding to the desired information.

Figures 5, 6:
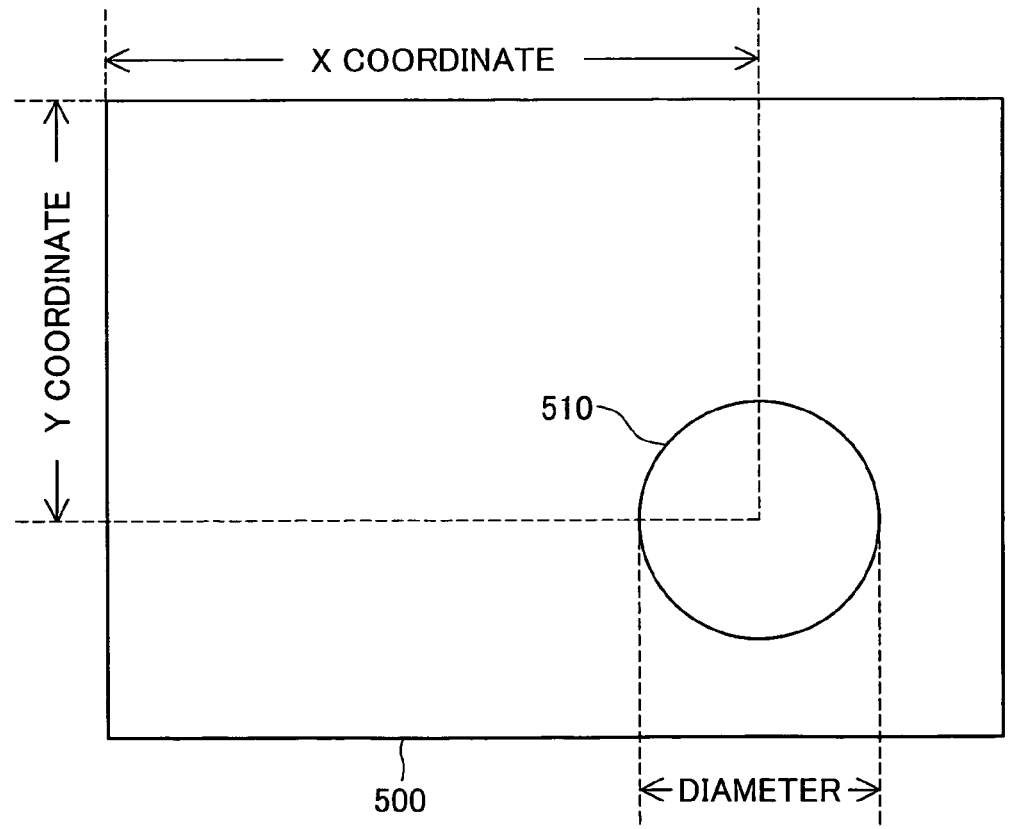
FIG. 5 illustrates an example of the data structure of an Exif information field.
FIG. 6 illustrates a subject area in an image 500.

FIG. 5 is an explanatory diagram illustrating an example of data structure (data tag names and parameter values) in the Exif data field in FIG. 4, where tag names can be referenced by tracing in the order APP1-IFD0-Exif. As shown in FIG. 4, the Exif data field can include a data field whose tag name is MakerNote. The MakerNote data field can in turn include a plurality of items of data, although these are not shown in FIG. 5.

As shown in FIG. 5, the Exif data field stores parameter values relating to information such as subject distance, exposure program, photograph scene, aperture value, and ISO speed rate.

The exposure program information and photograph scene information are used in a first embodiment of the automatic image data process in the invention. The exposure program information allows any of manual, normal, exposure priority, shutter priority, creative, action, portrait, or landscape programs to be appropriately selected according to the photographing conditions. The normal program is selected as the default setting.

The subject area information is used in a second embodiment of the automatic image data process of the invention. FIG. 6 illustrates the subject area 510 in an image 500. As illustrated, the subject area is represented by central coordinates starting on the left of the image, and area diameter. The subject area may be rectangular, in which case the range of the area is represented by height and width. The subject information has such information specifying the subject area.

Information related to the image data may be appropriately stored in fields other than the Exif data field in FIG. 4. For example, the Manufacturer's name or Model name specifying the image-producing device can be stored in the data field with the IFD0 tag.

C. Structure of Image Output Device Capable of Using Image File

Figure 7:
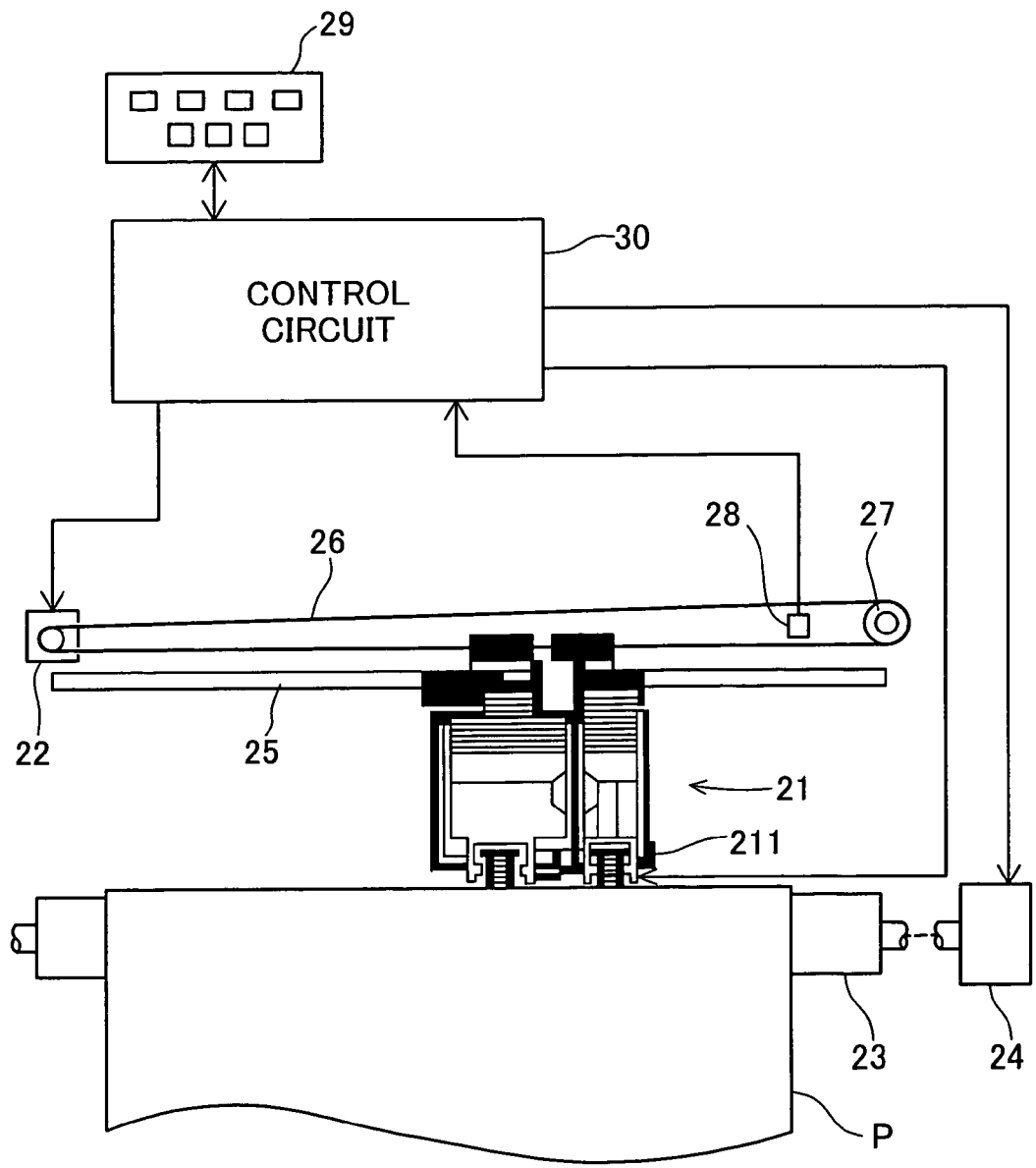
FIG. 7 is a block diagram showing the schematic structure of a printer 20.

FIG. 7 is a block diagram schematically illustrating the structure of a printer 20. The printer 20 is capable of image output; for example, it is an ink jet printer that ejects ink of four colors, cyan C, magenta Mg, yellow Y, and black K, on a print medium to produce a dot pattern. An electrophotoimage printer that transfers and fixes toner onto a print medium may also be used. In addition to the four colors indicated above, light cyan LC which is lighter in density than cyan C, light magenta LM which is lighter in density than magenta Mg, and dark yellow DY which is darker in density than yellow Y may be used as ink. Where monochromatic printing is performed, the arrangement may employ black K only; or red R or green G may be used. The type of ink or toner used can be selected depending on the characteristics of the image for output.

As shown in the drawing, the printer 20 comprises a mechanism for driving a print head 211 mounted on a carriage 21, to eject ink and form dots; a mechanism for reciprocating the carriage 21 in the axial direction of a platen 23 by means of a carriage motor 22; a mechanism for feeding printer paper P by means of a paper feed motor 24; and a control circuit 30. By means of these mechanisms, the printer 20 functions as an image output component. The mechanism for reciprocating the carriage 21 in the axial direction of a platen 23 is composed of a slide rail 25 extending parallel to the axis of the platen 23, for slidably retaining the carriage 21; a pulley 27 coupled via an endless drive belt 26 to a carriage motor 22; and a position sensor 28 for sensing the home position of the carriage 21. The mechanism for feeding printer paper P is composed of the platen 23; the paper feed motor 24 which rotates the platen 23; an auxiliary paper feed roller, not shown in the drawing; and a gear train (not shown) for transmitting the rotation of the paper feed motor 24 to the platen 23 and the auxiliary paper feed roller.

The control circuit 30 exchanges signals with a printer control panel 29 while appropriately controlling the operation of the paper feed motor 24, carriage motor 22, and print head 211. Printer paper P supplied to the printer 20 is inserted between the platen 23 and the auxiliary paper feed roller, and is advanced in predetermined increments depending on the rotation angle of the platen 23.

The carriage 21 has the print head 211, and enables mounting of an ink jet cartridge of utilizable ink. On the bottom face of print head 211 are disposed nozzles for ejecting utilizable ink (not shown).

Figure 8:
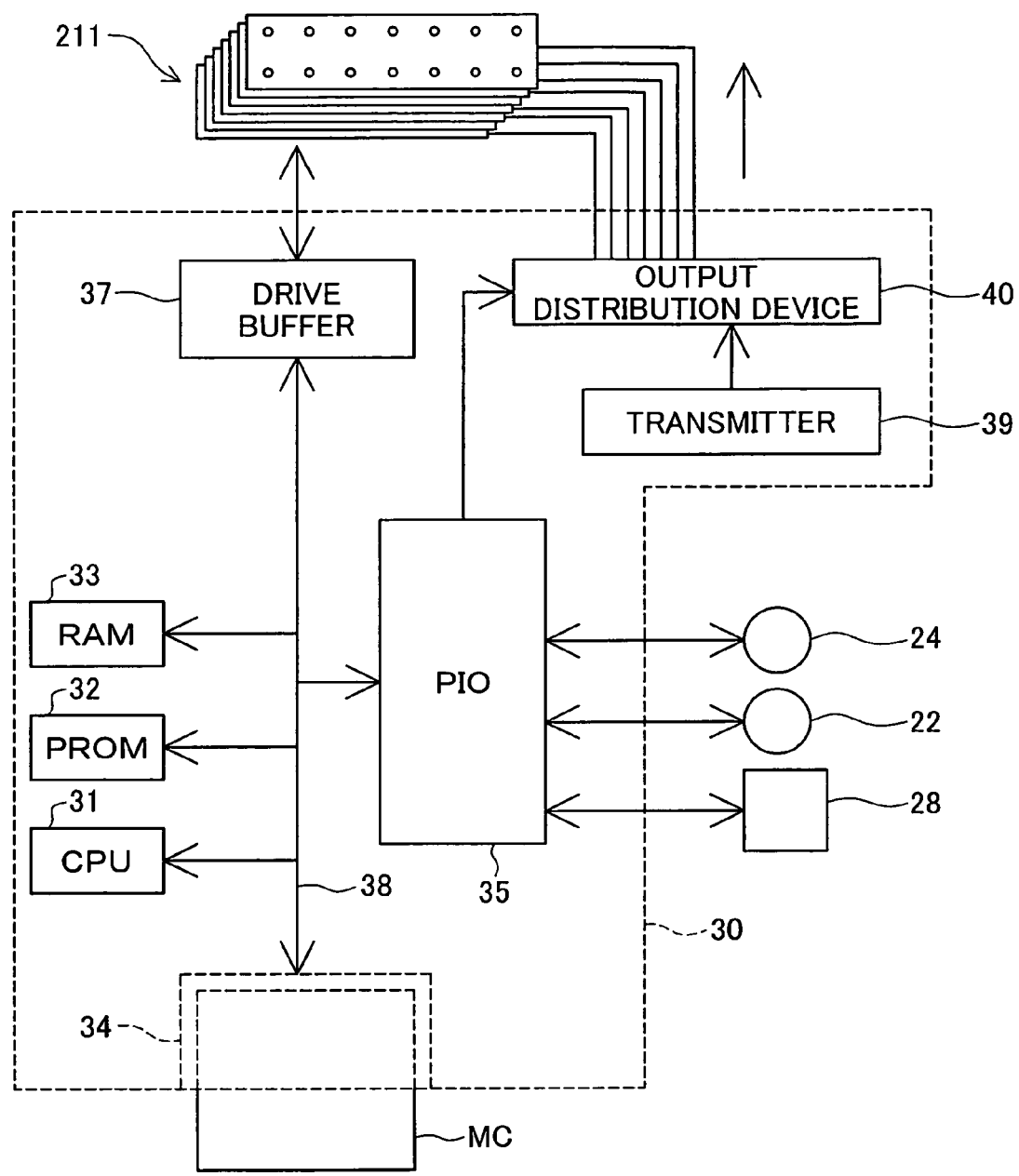
FIG. 8 is a block diagram of the structure of the printer 20, focusing on the control circuit 30 of the printer 20.

FIG. 8 is a block diagram showing the structure of the printer 20, focusing on the control circuit 30 of the printer 20. Within control circuit 30 are disposed a CPU 31, PROM 32, RAM 33, a memory card slot 34 for acquiring data from a memory card MC, a peripheral device input/output component (PIO) 35 for exchanging data with the paper feed motor 24 or carriage motor 22, etc., and a drive buffer 37. The drive buffer 37 is used as a buffer for supplying dot on/off signals to the print head 211. These components are interconnected by a bus 38, allowing them to exchange data. The control circuit 30 is also provided with a transmitter 39 for outputting a drive waveform at a certain frequency, and an output distribution device 40 for distributing the output of transmitter 39 to the print head 211 at a predetermined timing.

The control circuit 30 outputs dot data to the drive buffer 37 at a predetermined timing in synchronization with the operations of the paper feed motor 24 and carriage motor 22. The control circuit 30 also reads image files from the memory card MC, analyzes the ancillary information, and processes the image based on the image production record information. That is, the control circuit 30 functions as an image data processor. The details of the image processing performed by the control circuit 30 will be described in detail below.

D. Image Data Process for Digital Still Camera

Figure 9:
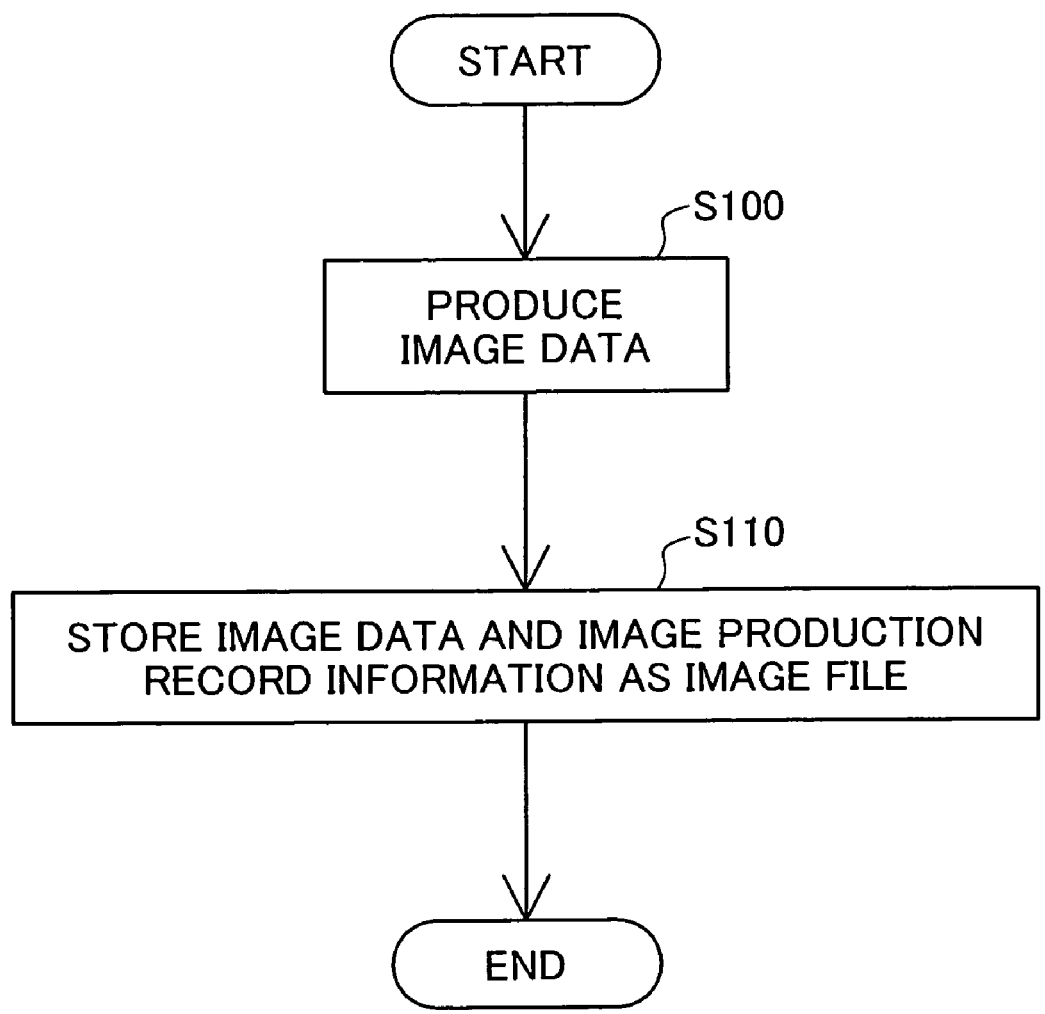
FIG. 9 is a flow chart of the process for producing an image file GF in a digital still camera 12.

FIG. 9 is a flowchart illustrating a process for producing an image file GF in a digital still camera 12.

The control circuit 124 (FIG. 2) of the digital still camera 12 produces image data GD in response to a photographing request such as depressing the shutter button (Step S100). When a parameter such as the aperture value, exposure program, or photograph scene has been set, image data GD is produced using the set parameter values.

The control circuit 124 stores the resulting image data GD and image production record information GI as an image file GF on the memory card MC (Step S110), and terminates the processing routine. The image production record information GI includes parameters used at the time the image is produced, such as aperture value and ISO sensitivity, custom set parameters such as the photograph scene, and automatically set parameters such as the Manufacturer's name and Model name. Image data GD is also stored in the image file GF after being converted from the RGB color space to the YCbCr color space and then compressed in JPEG format.

As a result of the aforementioned processes executed by the digital still camera 12, both image data GD and image production record information GI including various parameter values at the time the image data was produced are set in the image files GF stored on the memory card MC.

E. Image Data Process in Printer

Figure 10:
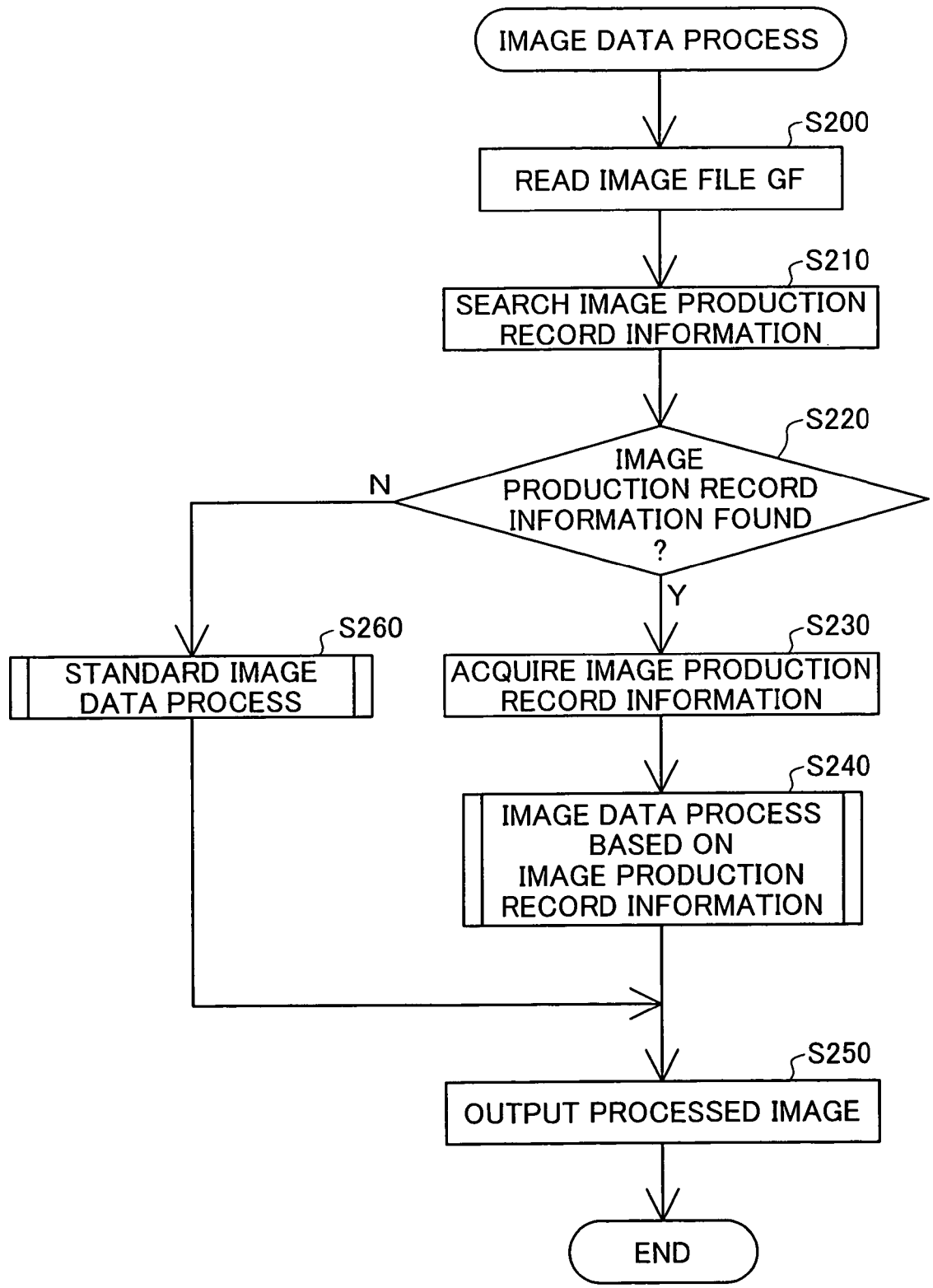
FIG. 10 is a flow chart of a routine for image data processing in the printer 20.

FIG. 10 is a flowchart of a routine for processing images in the printer 20 of the present embodiment. The following description is based on cases where a memory card MC with image files GF stored thereon is inserted directly into the printer 20. When the memory card MC has been inserted into the memory card slot 34, the CPU 31 of the control circuit 30 (FIG. 7) of the printer 20 reads the image file GF from the memory card MC (Step S200). Next, in Step S210, the CPU 31 searches the ancillary information storage field of the image file GF for image production record information GI indicating information at the time that the image data was produced. When image production record information GI is found (Step S220: Y), the CPU 31 acquires and analyzes the image production record information GI (Step S230). Based on the analyzed image production record information GI, the CPU 31 executes the following image process (Step S240), outputs the processed image (Step S250), and terminates the processing routine.

On the other hand, an image file created by a drawing application or the like will not contain image production record information GI having information such as the aperture value. If the CPU 31 cannot find image production record information GI (Step S200: N), the standard process is performed (Step S260), the processed image is output (Step S250), and the processing routine is terminated.

F. Embodiment of Automatic Image Data Process

In the first and second embodiments described below, rimless L size prints are made of images taken with a digital still camera (DSC). The aspect ratio of images produced by a DSC in the embodiments is 3:4, and the L size aspect ratio is 3:4.415. In other words, because the DSC image is longer than that of L size, a printing image is produced by matching the lateral length of the image to that of L size, and then cutting the image at the top and bottom. In an ordinary process with no trimming, a printing image would be produced by enlarging or reducing the image so that the entire image would be included in the printing area.

F1. First Embodiment

Figure 11:
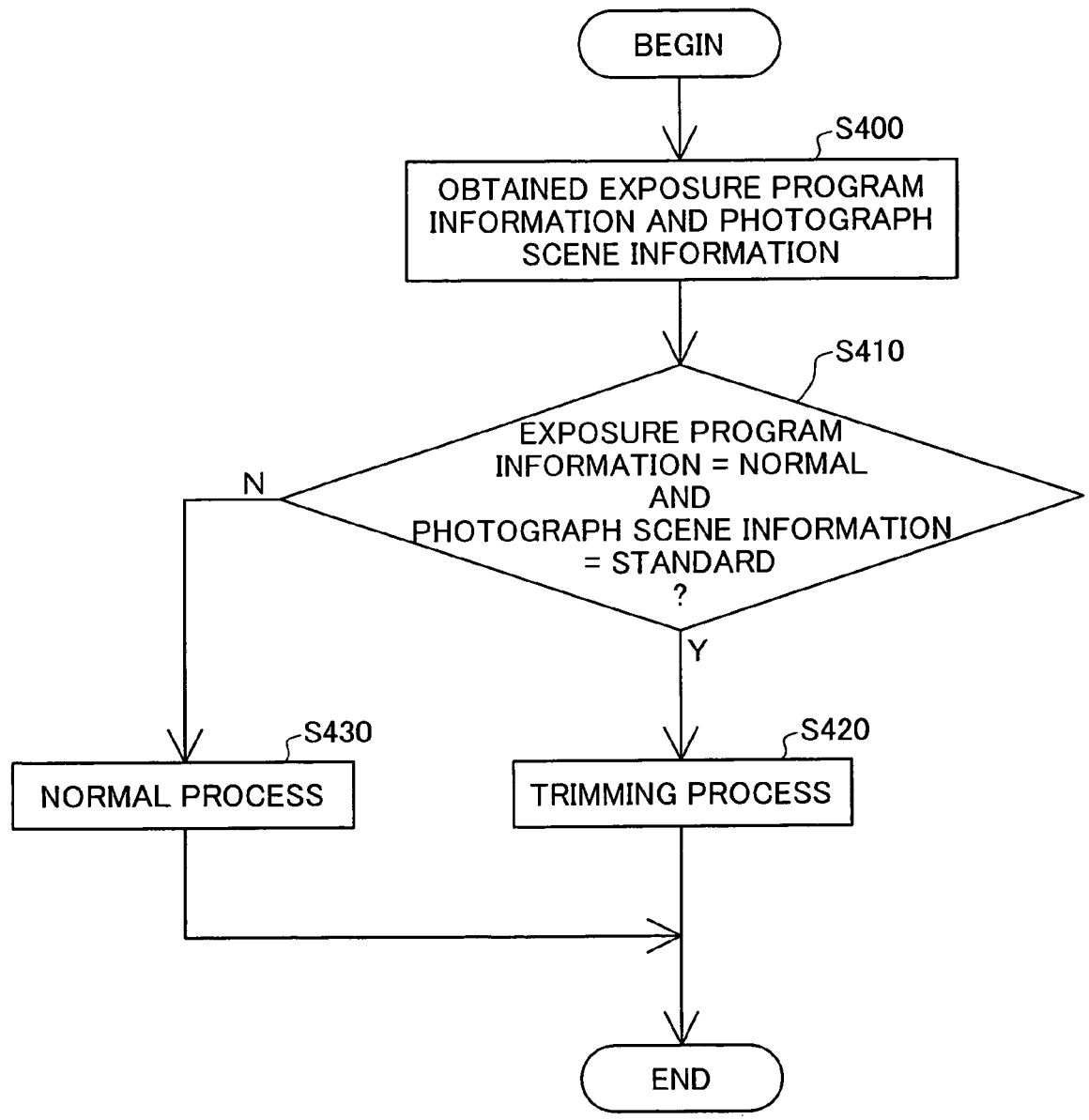
FIG. 11 is a flow chart of a routine for automatic image data processing.

FIG. 11 is a flow chart of a routine for an automatic image data process (step S240 in FIG. 10) in a first embodiment. In this embodiment, a determination is made as to whether or not to trim the image based on the exposure program information and the photograph scene information. First, the CPU 31 (FIG. 8) analyzes the image production record information GI and obtains the exposure program information and photograph scene information (step S400). Then, in step S410, the CPU 31 determines whether or not to trim the image. In this embodiment, the trimming is to be executed when the normal program has been selected as the exposure program information, and the standard scene has been selected as the photograph scene information. Next, either a trimming process (step S420) or the usual process (step S430) is executed based on the determination in step S410, and the process routine is terminated.

The following descriptions are of an example of an image being trimmed in step S420 and an example of an image processed in the usual manner in step S430.

Figure 12A:
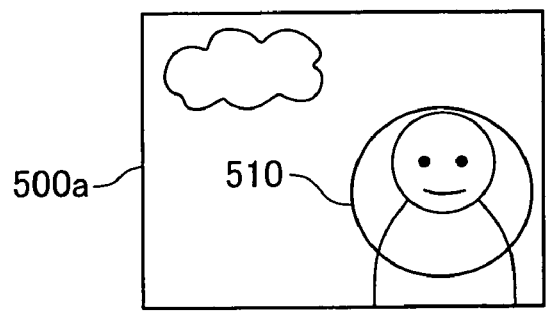
FIGS. 12(A) through 12(C) illustrate an example of an image produced by a DSC and its printing image.
Figure 12B:
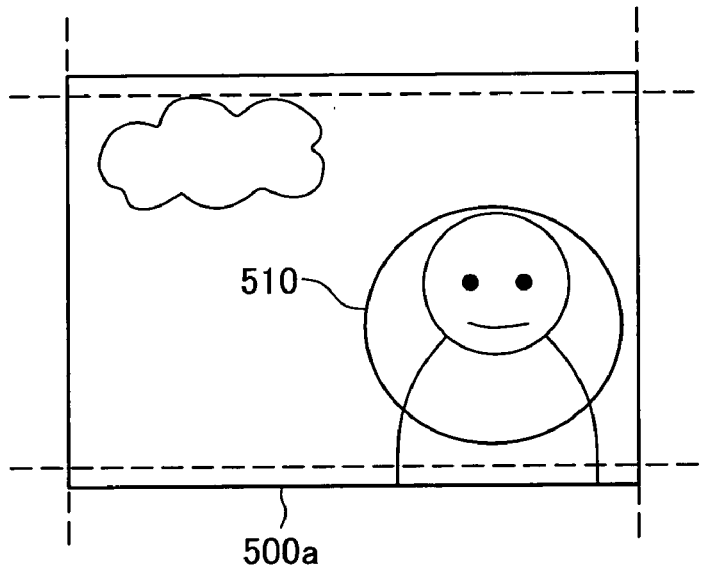
Figure 12C:
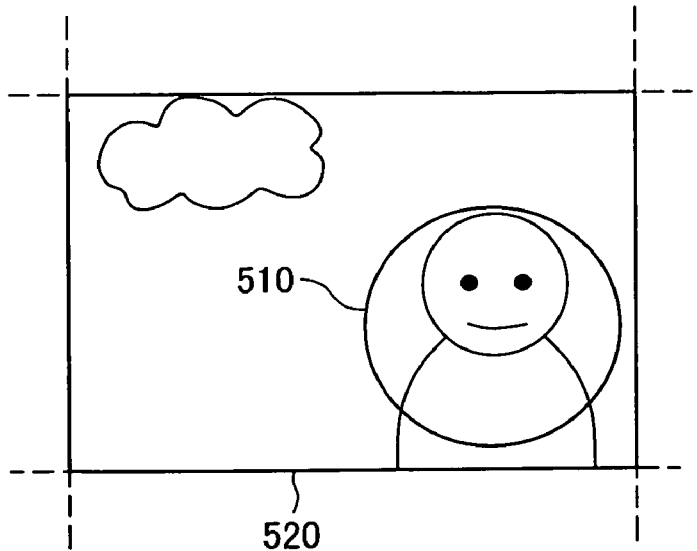

FIGS. 12(A)-12(C) illustrate an example of an image produced by a DSC and its printing image. FIG. 12(A) shows an image 500 produced by a DSC, where a subject area 510 has been set in the image 500a. The area surrounded by the dashed lines in FIGS. 12(B) and 12(C) represents the printing area (area to be trimmed) when printed in L size. As noted above, when the image is trimmed, the image 500a is enlarged or reduced to match the lateral length of the image 500a to the L size printing area, as illustrated in FIG. 12(B). The image 500a was taken under conditions where the exposure program was the normal program and the photograph scene information was a standard scene. In general, when the exposure program information and photograph scene information are set to the default, the photographer often takes the picture without any especial compositional intent, and there is often greater background space around the subject (a person in this embodiment). Based on the aforementioned conditions, it is determined that the image 500a in FIG. 12(A) should be trimmed in step S410 in FIG. 11, and the top and bottom of the image are cut by the trimming process, giving the printing image 520 illustrated in FIG. 12(C).

Figure 13A:
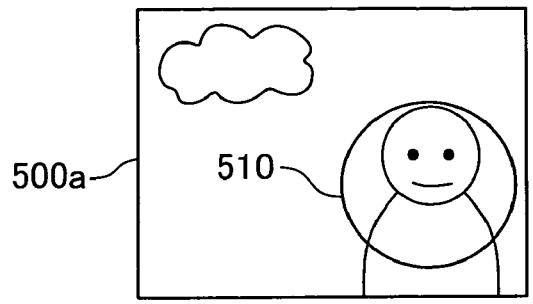
FIGS. 13(A) through 13(C) illustrate another example of an image produced by a DSC and its printing image.
Figure 13B:
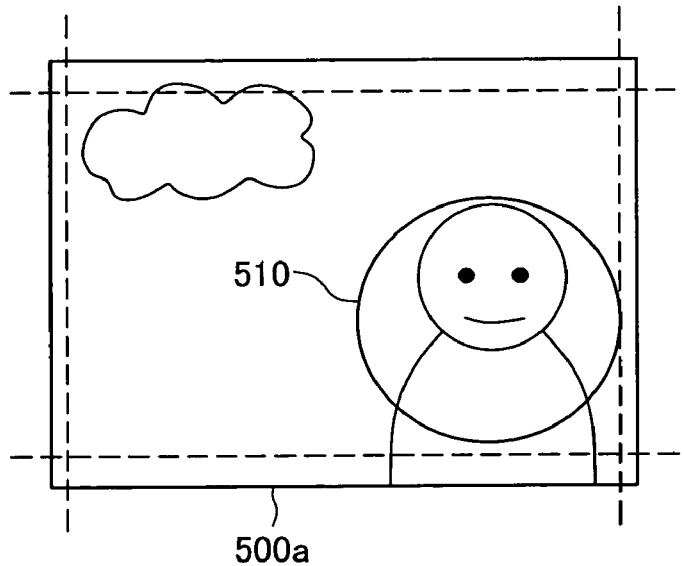
Figure 13C:
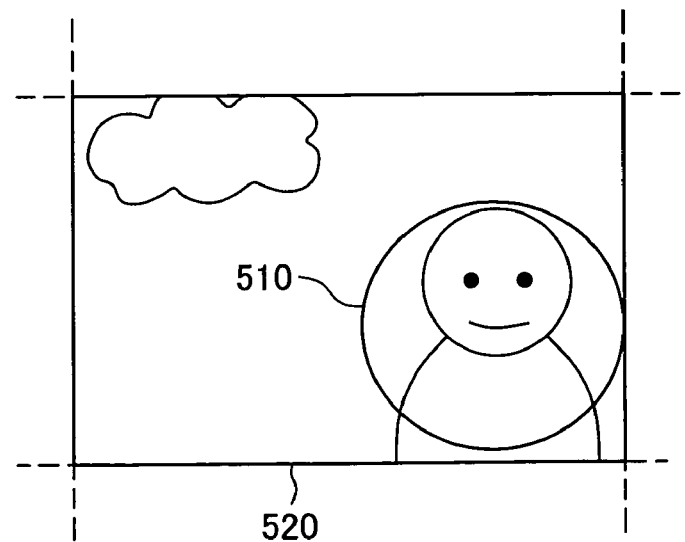

FIGS. 13(A)-13(C) illustrates another example of trimming. The image 500a in FIG. 13(A) is the same as that in FIG. 12(A), but the image 500a in FIG. 13(B) is enlarged more than in the example in FIG. 12(B). That is, the image 500a in FIG. 13(B) is enlarged so that both the height and width are greater than the printing area (indicated by dashed lines). The magnification at this time is set, for example, in such a way that the subject area 510 will not extend beyond the printing area. Setting the magnification in such a way that the subject area 510 is adjacent to the outer periphery of the printing area, as illustrated in FIGS. 13(B) and 13(C), is advantageous in terms of allowing the subject area 510 to be reproduced larger. Alternatively, the magnification may also be set so that the subject area 510 is inwardly separate by a certain distance (such as 5 mm) from the outer periphery of the printing area.

Figure 14A:
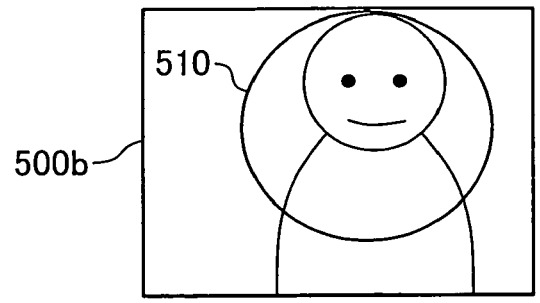
FIGS. 14(A) through 14(C) illustrate yet another example of an image produced by a DSC and its printing image.
Figure 14B:
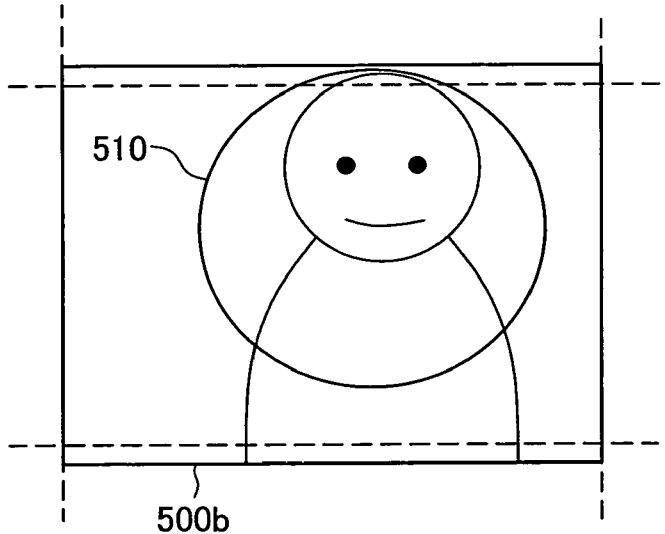
Figure 14C:
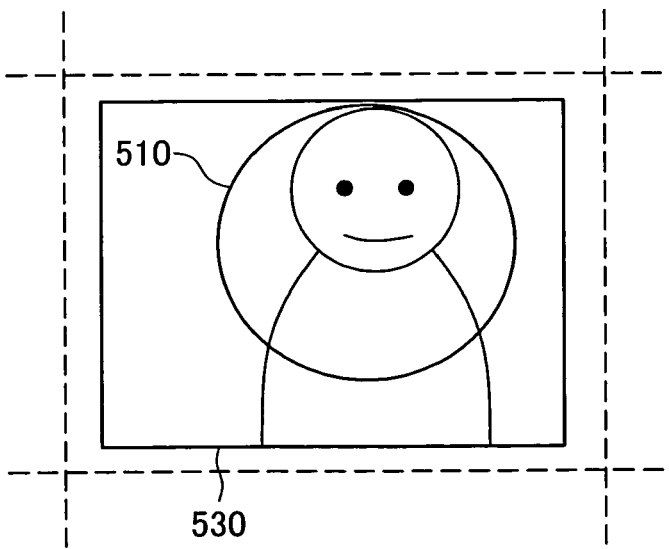

FIGS. 14(A)-14(C) illustrates yet another example of an image produced by a DSC and a printing image which has undergone an automatic image data process. FIG. 14(A) illustrates an image 500b produced by a DSC, where the subject area 510 has been set in the image 500b. The area surrounded by the dashed lines in FIGS. 14(B) and 14(C) represents the printing area when printed in L size. As noted above, when the image is trimmed, the image 500b is enlarged or reduced to match the lateral length of the image 500b to the L size printing area, as illustrated in FIG. 14(B). The image 500b was taken under conditions where the exposure program was the normal program and the photograph scene information was of a person. In general, when the exposure program information and/or photograph scene information are set outside the default, the photographer often takes the picture with a particular compositional intent, and the subject (a person in this embodiment) often takes up most of the background space. In this embodiment, because the photograph scene was set to a human, it is determined that the image 500b in FIG. 14(A) should not be trimmed in step S410 in FIG. 11, and the image is reduced so that the entire image is inside the printing area, thus producing a printing image 530 as illustrated in FIG. 14(C). In this embodiment, a margin is provided at the top and bottom as well as the left and right of the image 530, but the image 530 may also fit inside the L size printing area. The longitudinal length of the image 530 may, for example, be matched to the longitudinal length of the printing area.

The determination as to whether or not to trim individual image data can thus be automatically determined in this embodiment because the determination as to whether or not to trim the image is based on the exposure program information and photograph scene information related to the image data.

F2. Second Embodiment

Figure 15:
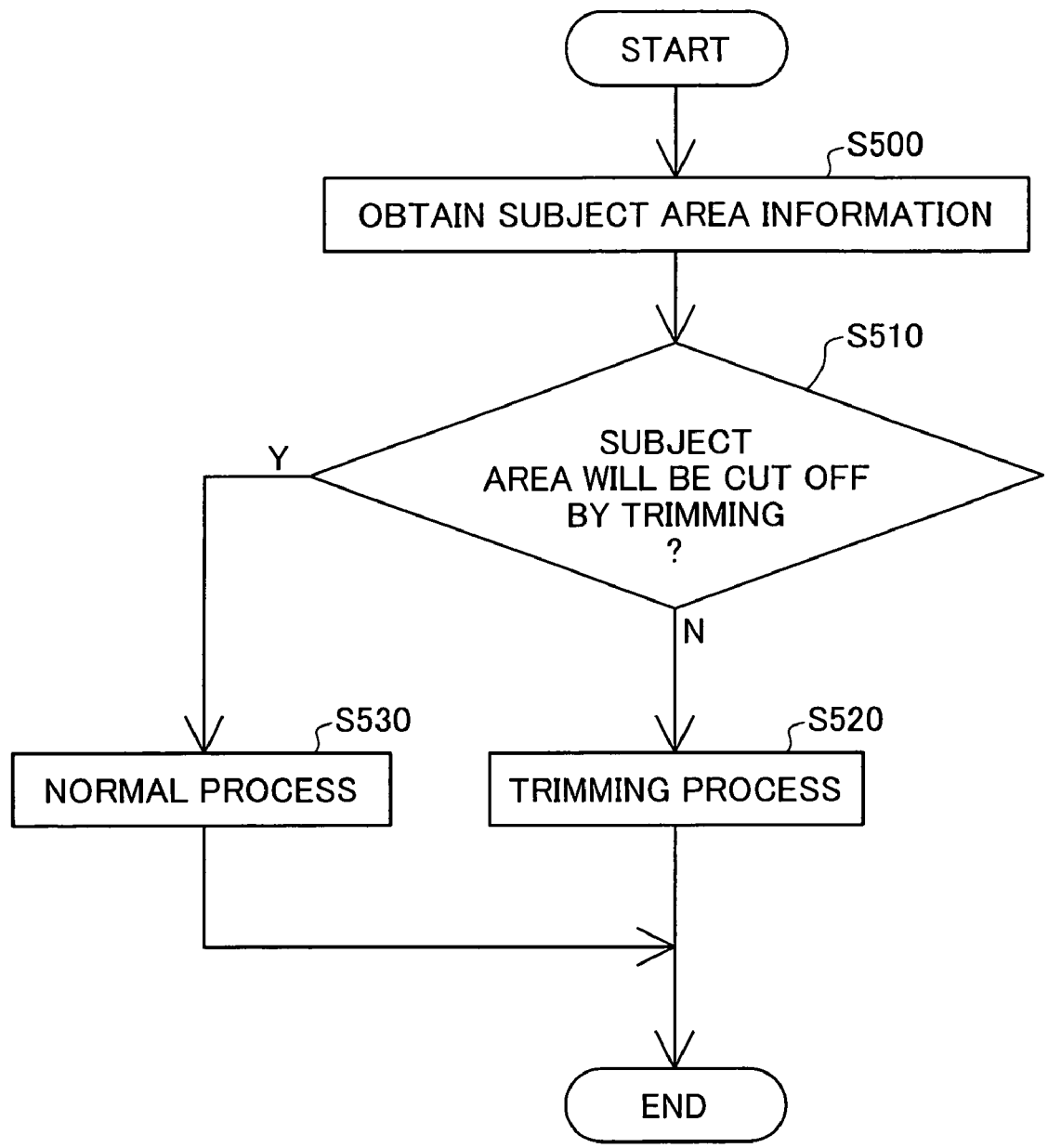
FIG. 15 is a flow chart of a routine for automatic image data processing.

FIG. 15 is a flow chart of a routine for an automatic image data process (step S240 in FIG. 10) in a second embodiment. In this embodiment, the determination as to whether or not to trim the image is based on the subject area information. First, the CPU 31 (FIG. 8) analyzes the image production record information GI and acquires the subject area information (step S500). Then, in step S510, the CPU 31 judges whether or not the subject area will be cut as a result of the trimming process. Then, based on the determination in step S510, either a trimming process (step S520) or the usual process (step S530) is executed, and the process routine is terminated.

The following descriptions are of an example of an image being trimmed in step S520 and an example of an image processed in the usual manner in step S530.

In the above example in FIGS. 12(A)-12(C), as is evident in FIG. 12(B), the subject area 510 is not cut when the image is trimmed. It is thus determined that the image 500a in FIG. 12(A) should be trimmed in step S510 in FIG. 15, and the top and bottom are cut in the trimming process to produce the printing image 520, as illustrated in FIG. 12(C). As an alternative to the trimming method in FIGS. 12(A)-12(C), the determination to likewise trim the image is made when adopting the trimming method in FIG. 13(A)-13(C).

In the example in FIGS. 14(A)-14(C), as is evident in FIG. 14(B), part of the subject area 510 will be cut if the image is trimmed. It is thus determined that the image 500b in FIG. 14A should not be trimmed in step S510 in FIG. 15, and the entire image is reduced so as to be inside the printing area to produce the printing image 530, as illustrated in FIG. 14(C).

The determination as to whether or not to trim individual image data can thus be automatically determined in this embodiment because the determination as to whether or not to trim the image is based on the subject area information related to the image data.

G. Structure of Image Output System Using Image Data Processing Device

Figure 16:
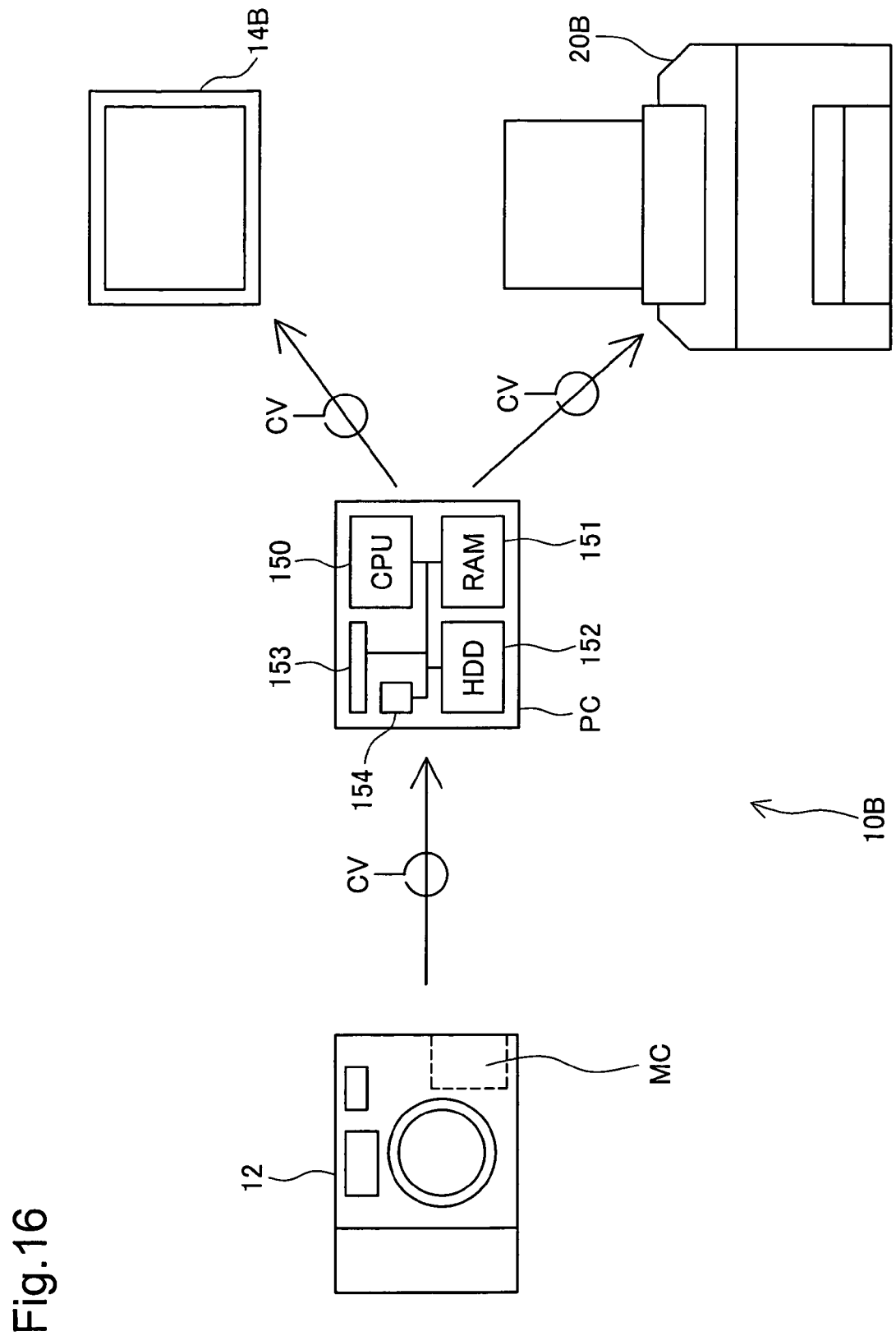
FIG. 16 illustrates an example of an image output system applicable to an image data processing device.

FIG. 16 illustrates an embodiment of an image output system capable of employing the image data processing device according to an embodiment of the invention. The image output system 10B comprises a digital still camera 12 as an image-producing device for producing image files, a computer PC for running the image data process based on the image files, and a printer 20B as an image output device for outputting images. The computer PC is a commonly used type of computer and functions as an image data processing device. A CRT display, LCD display, or other monitor 14B, or a projector or the like, can be used as the image output device instead of the printer 20B. In the following description, it is assumed that the printer 20B is used as the image output device. This embodiment differs from the image output system embodiment described previously (FIG. 1) in that the image data processing device having an image data processor and the image output device having an image output unit are constituted independently. The computer PC serving as the image data processing device and the printer having an image output unit can be referred to as an "output device" in the broad sense.

An image file created in the digital still camera 12 is transferred to the computer PC via a cable CV, or by directly inserting a memory card MC having the image file stored thereon into the computer PC. The computer PC executes image data processing of the image data based on the read out image file. The image data produced by the image data process is transferred to the printer 20B via a cable CV, and output by the printer 20B.

The computer PC comprises a CPU 150 for executing a program that realizes the aforementioned image data process; RAM 151 for temporarily storing the calculated results by the CPU 150, image data, and the like; and a hard disk drive (HDD) 152 for storing data needed for the image data process, such as an image data processing program, lookup tables, or aperture value tables. The CPU 150, RAM 151, and HDD 152 function as the image data processor. The computer PC further comprises a memory card slot 153 for installing a memory card MC; and an input/output terminal 154 for connecting a connector cable from the digital still camera 12 or the like.

An image file GF created by a digital still camera 12 is supplied to the computer PC via a cable or via a memory card MC. When an image data processing application program such as an image retouching application or a printer driver is activated by user operations, the CPU 150 executes an images processing routine (FIG. 10) to process the read image file GF. Alternatively, the image data processing application program may be set to start up automatically when a memory card MC is inserted into the memory card slot 153, or when connection of a digital still camera 12 to the input/output terminal 154 via a cable is detected.

Image data processed by the CPU 150 is transferred to an image output device such as the printer 20B instead of being output in Step S250 of the images processing routine (FIG. 10), whereupon the image output device receiving the image data outputs the image.

In this embodiment, images are processed using an image data processor in the computer PC, making it possible to use an image output device that does not have an image data processor. Where the image output device is provided with an image data processor, the image data may be sent to the image output device without being subjected to image processing on the computer PC, and the image data processor of the image output device can perform the image process.

As noted above, the determination as to whether or not to trim individual image data can thus be automatically determined in the above embodiments because the determination on whether or not to trim the image is based on image production record information related to the image data.

The invention is not limited to the above embodiments, and can be worked in a variety of embodiments within the scope of the invention. The following are possible variants.

H. Variants

H1. Variant 1

In the first embodiment, it is determined to execute the trimming on condition that the normal program has been selected as the exposure program information, and that the standard scene has been selected as the photograph scene information, but other conditions can be used to make the determination. For example, the trimming may also be executed on condition that the normal program has been selected as the exposure program information, and that landscape or night time scene has been selected as the photograph scene.

H2. Variant 2

In the first and second embodiments above, an image is printed immediately after the determination is made on whether or not to trim the image, but users can be given the option of turn trimming on or off before printing. For example, thumbnails of how the images will look after the automatic image data process can be displayed before printing, and the user may check the images to switch trimming on or off.

H3. Variant 3

The above first and second embodiments may also be combined. For example, in step S410 in FIG. 11, when the determination is made to trim the image, the routine in FIG. 15 may also be executed in step S420. This will permit more reliable decisions on whether or not to trim images.

H4. Variant 4

When the subject area 510 is to be cut as a result of the trimming process as in image 500 in FIG. 14(A) in the second embodiment, the trimming process may be implemented by offsetting the printing area so that the subject area 510 is not cut. In the embodiment in FIG. 14(A), for example, when the image is trimmed, the upper part of the subject area 510 is cut, but the image can be trimmed by trimming only the bottom portion of the image so as to avoid damaging the subject area 510. When the longitudinal size of the subject area 510 is greater than that of the printing area in the second embodiment, the image is not trimmed, and the above process does not have to be implemented.

H5. Variant 5

In the above embodiments, the trimming process is implemented by matching the longitudinal or lateral size of the image to the output size, and cutting off the parts that extend beyond, but the process can generally be implemented in such a way that the image is enlarged or reduced with the same aspect ratio to a size encompassing the designated image output size to cut off the portions extending beyond the image output size.

H6. Variant 6

A printer is used as the image output device in the above embodiments, but other image output devices can be used instead of printers. Embodiments include the use of CRT displays, LCD displays, and projectors as the image output device.

H7. Variant 7

Files in Exif format are used as specific examples of image files GF in the above embodiments, but the format of image files in the invention are not limited, and any other formats can be used. In general, image files include image data produced by an image-producing device and image production record information GI indicating the conditions when the image data is produced. Such files allow image data produced by the image-producing device to be processed automatically as appropriate and to be output from an output device. The subject area is not limited to the parameters of the Exif format described above, and can be realized by the parameters and data of various other formats. For example, parameters indicating the focus field or the focus position during auto-focus operation may be used. When users can specify any subject area position or its shape when taking photographs, the parameters representing them may be used as the parameters showing the subject area.

H8. Variant 8

A digital still camera 12 is used as an image-producing device in the above embodiments, but image files can be produced using other devices such as scanners and digital video cameras.

H9. Variant 9

Image data GD and image production record information GI are included in the same image files GF in the above embodiments, but the image data GD and image production record information GI need not necessarily be stored in the same image file. That is, it is sufficient if the image data GD and image production record information GI are related. For example, related data relating the image data GD and image production record information GI can be produced, one or more instances of image data GD and image production record information GI can be stored in independent files, and the related image production record information GI can be referenced when the image data GD is processed. In such cases, even though the image data GD and image production record information GI are stored in separate files, the image data GD and image production record information GI are indispensably related when the image is processed using the image production record information GI, and the situation is substantially the same as when they are stored in the same file. That is, at least at the point where the image is processed, the relationship between the image data GD and image production record information GI is included in the image file GF in this embodiment. Motion image files stored in optical disks such as CD-ROM, CD-R, DVD-ROM, and DVD-RAM are also included.

The invention was illustrated and described in detail above, but these are given only as embodiments and do not in any way limit the invention. The concept and scope of the invention is limited only by the attached claims.

What is claimed is:

1. An image processing method, comprising:
   supplying, to an image processing device, image data produced by a camera which is separate from the image processing device, and image production record information related to the image data, the image production record information being produced by the camera, the image production record information including at least subject area information representing a subject area in an image; and
   under control of the image processing device, determining whether or not the subject area will be cut by a trimming process for trimming the image data;
   if the subject area will not be cut by the trimming process, executing the trimming process; and
   if the subject area will be cut by the trimming process, reducing a size of the image represented by the image data without executing the trimming process.

2. An image processing method according to claim 1, wherein
   the image production record information includes at least exposure program information and photograph scene information, and
   the trimming process is executed in case the exposure program information and photograph scene information meet specific conditions.

3. An image processing method according to claim 2, wherein
   the specific conditions include selection of a normal program which is set as default for the exposure program information, and selection of a standard scene which is set as default for the photograph scene information.

4. An image processing method according to claim 1, wherein
   the trimming process is a process in which an image is enlarged or reduced, while preserving an aspect ratio, to a size encompassing a designated image output size, and portions extending outside the image output size are cut off.

5. An image processing device for processing an image using image data produced by a camera which is separate from the image processing device, and image production record information related to the image data the image production record information being produced by the camera, the image production record information including at least subject area information representing a subject area in an image, the image processing device comprising:
   an image data processor that determines whether or not the subject area will be cut by a trimming process for trimming the image data, that executes the trimming process if the subject area will not be cut by the trimming process, and that reduces a size of the image represented by the image data without executing the trimming process if the subject area will be cut by the trimming process.

6. An output device for outputting an image using image data produced by a camera which is separate from an image processing device, and image production record information related to the image data the image production record information being produced by the camera, the image production record information including at least subject area information representing a subject area in an image, the output device comprising:
   an image information processor that determines whether or not the subject area will be cut by a trimming process for trimming the image data, that executes the trimming process if the subject area will not be cut by the trimming process, and that reduces a size of the image represented by the image data without executing the trimming process if the subject area will be cut by the trimming process; and
   an image output unit that outputs an image according to the image data processed by the image information processor.

7. A computer program product for executing an image process using image data produced by a camera which is separate from an image processing device, and image production record information related to the image data the image production record information being produced by the camera, the image production record information including at least subject area information representing a subject area in an image, the computer program product comprising:
   a computer-readable storage medium; and
   a computer program stored on the computer-readable storage medium, the computer program including a program for causing a computer to determine whether or not the subject area will be cut by a trimming process for trimming the image data, to execute the trimming process if the subject area will not be cut by the trimming process, and to reduce a size of the image represented by the image data without executing the trimming process if the subject area will be cut by the trimming process.

* * * * *